United States Patent [19]
Keene

[11] 3,918,408
[45] Nov. 11, 1975

[54] RUBBING AND LIQUID APPLYING APPARATUS

[76] Inventor: George W. Keene, P.O. Box 395, Rochelle, Ill. 61068

[22] Filed: July 12, 1974

[21] Appl. No.: 488,173

[52] U.S. Cl.............................. 119/157; 119/157
[51] Int. Cl.²....................................... A01K 29/00
[58] Field of Search..................... 119/156, 157, 159

[56] References Cited
UNITED STATES PATENTS

| | | | |
|---|---|---|---|
| 3,038,445 | 6/1962 | Fleming | 119/157 |
| 3,103,916 | 9/1963 | Keene | 119/157 |

*Primary Examiner*—J. N. Eskovitz
*Attorney, Agent, or Firm*—Fitch, Even, Tabin & Luedeka

[57] ABSTRACT

An improved rubbing and liquid applying apparatus for livestock is disclosed which comprises a frame structure that supports a rotatable elongated cylinder at an inclined angle relative to horizontal. The cylinder defines a reservoir for containing liquid that is applied to the livestock and has an Archimedes' screw pump in the form of a spiral tube for conveying the liquid from near the bottom of the reservoir upwardly to the upper end portion thereof. The apparatus includes a ratchet mechanism for restricting rotation of the cylinder to one angular direction so that the liquid is conveyed only upwardly during rotation. The amount of liquid that is delivered to the outside of the cylinder for application to the livestock is determined by a flow regulating mechanism that enables the amount of fluid that is delivered to the exterior of the cylinder to be independent of the flow rate of the Archimedes' screw.

14 Claims, 6 Drawing Figures

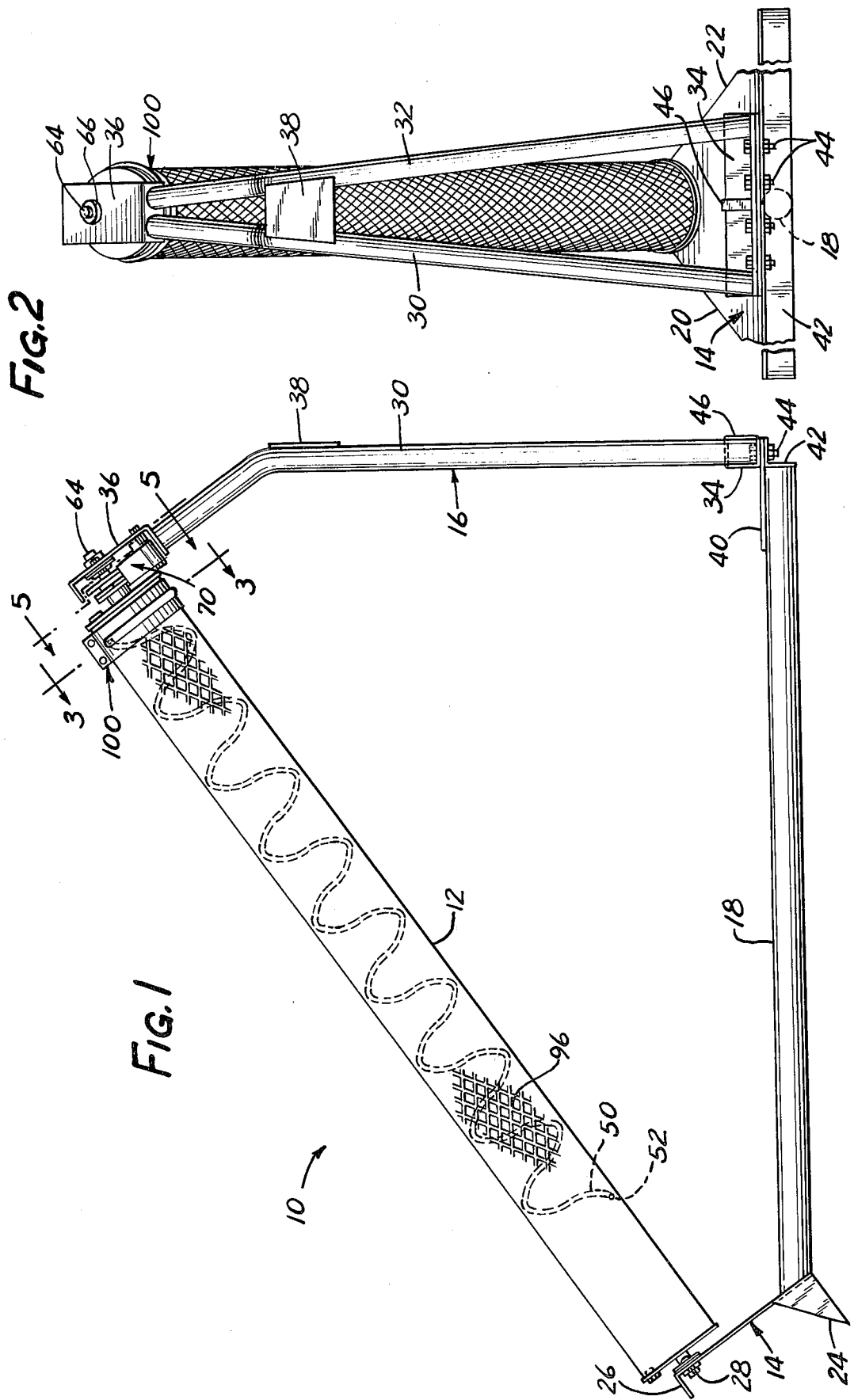

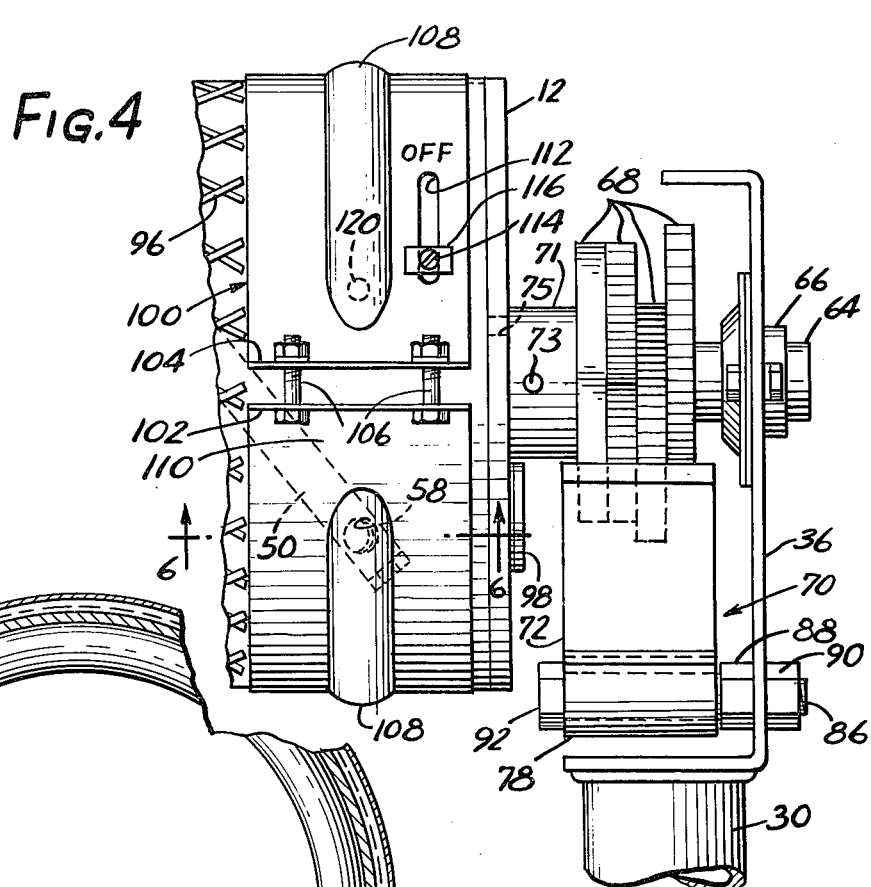
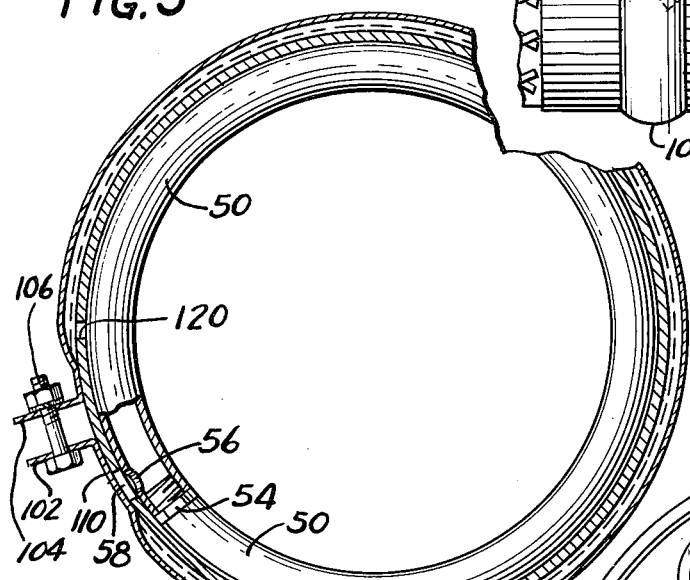
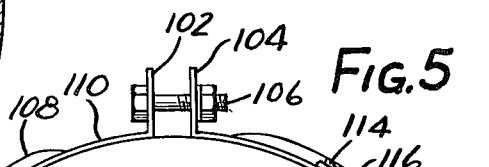
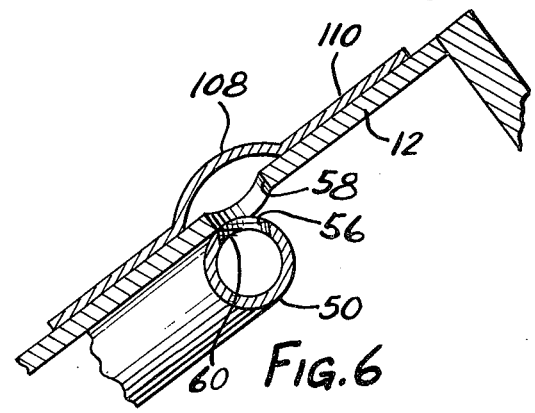
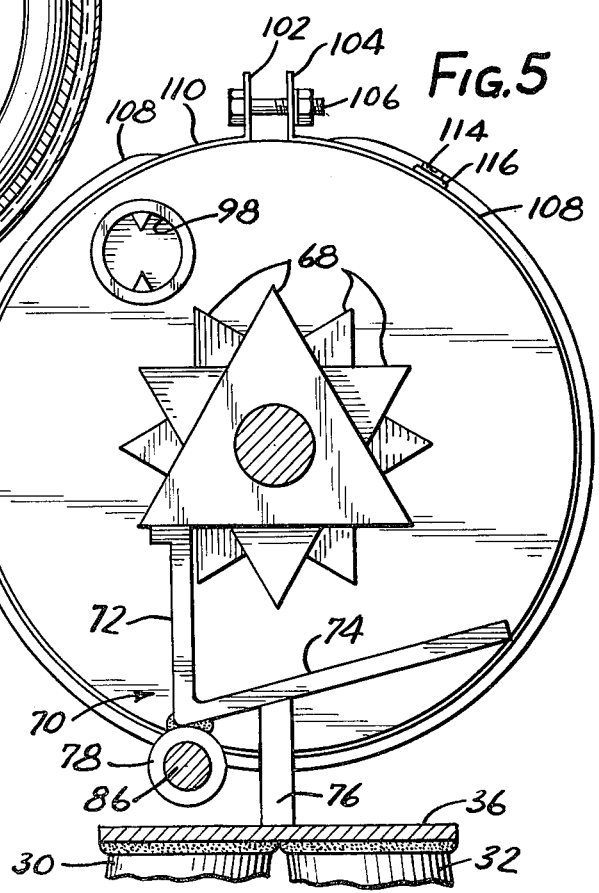

RUBBING AND LIQUID APPLYING APPARATUS

The present invention generally relates to apparatus for use by livestock and, more particularly, to liquid applying and rubbing apparatus for use by livestock such as cattle or pigs to rub or scratch their hides and also apply conditioning liquids and insecticides thereto.

While liquid applying and scratching apparatus for livestock, such as cattle and hogs, are now well known and often comprise a freestanding frame structure which supports an angularly inclined rotatable cylinder that has an abrasive outer surface against which cattle may rub or scratch. The elongated angularly inclined cylinder typically defines a reservoir for oil, insecticide or other conditioning liquid which is delivered to the outer surface so that the liquid will be transferred to the livestock when they rub against it. Many designs have used the Archimedes' screw as an effective and inexpensive means for conveying the liquid in the reservoir to the upper end of the cylinder so that it can be delivered to the outside surface of the cylinder for transfer to the animal when it rubs against the cylinder. The Archimedes' screw generally takes the form of a spiral tube that is attached to the inner surface of the cylinder, extends from the bottom to the top thereof, and has openings in both ends thereof. The upper end generally terminates at an opening in the cylinder wall in a manner whereby the tubing is perpendicular to the cylinder wall. Thus, as the spiral tube approaches the upper end of the cylinder, it is necessary to make a sharp bend so that the end of the tube can be generally perpendicular to the surface at the termination point. Such a sharp bend often causes problems in that it tends to flatten the pump tube and restrict the flow and may place a high stress on the tube that will occasionally cause the tube to break during use. When the upper end is terminated at an aperture in the cylinder wall by welding or the like, all of the fluid is delivered to the exterior surface of the cylinder unless some means are used to control or restrict the flow. This restricting means has been in the form of a band of cloth or the like wrapped around the cylinder adjacent the opening. However, disadvantages reside in the use of flow control means which reduce the flow of liquid through the spiral tube during rotation, for the reason that sediment and dirt may clog up or block the spiral tube, as well as create an air lock condition, either of which would prevent the liquid from being conveyed therethrough.

Accordingly, it is an object of the present invention to provide an improved liquid applying and rubbing apparatus for livestock which does not have the above mentioned disadvantages.

Other objects and advantages will become apparent upon reading the following detailed description, in conjunction with the attached drawings, in which:

FIG. 1 is a front elevation view of apparatus embodying the present invention;

FIG. 2 is a right end view of the apparatus shown in FIG. 1;

FIG. 3 is an enlarged cross sectional view taken generally along the line 3—3 in FIG. 1;

FIG. 4 is an enlarged view of a portion of the apparatus shown in FIG. 1;

FIG. 5 is an enlarged cross sectional view taken generally along the line 5—5 of FIG. 1; and FIG. 6 is a cross sectional view of a portion of the apparatus and is taken generally along the line 6—6 of FIG. 4.

Turning now to the drawings and particularly FIGS. 1 and 2, an embodiment of the present invention, indicated generally at 10, is shown to comprise an elongated cylinder 12 that is positioned at an inclined angle relative to horizontal, the lower end of which is supported by an end plate 14 and the upper end by a frame structure, indicated generally at 16, with the plate and frame being connected together by a horizontal member 18. The end plate 14, as shown in FIG. 2, is generally triangularly shaped with the left and right sides 20 and 22 extending downwardly to corners 24 (see FIG. 1) which are angularly bent relative to the plane of the plate 14 to dig into the ground and prevent the apparatus from being easily pushed around by livestock in a feedlot or the like. The top corner 26 of the triangularly shaped plate 14 is also bent downwardly generally perpendicular to the plane of the plate 14 for the purpose of providing a simple weather shield and to minimize the possibility of livestock dirt from being rubbed in a bearing 28 supporting the lower end of the cylinder.

The upper frame 16 generally comprises a pair of tubular members 30 and 32 which are attached at their lower ends to a right angled member 34 or the like by welding and to a generally C-shaped plate 36 at the upper end thereof. The tubular members are preferably welded to the underside of the C-shaped plate 36 and also preferably have a gusset plate 38 welded thereto to provide additional structural rigidity. The lower angled member 34 is preferably attached to a plate 40 and to another right angled member 42 by bolts 44, with the plate 40 preferably being attached to the horizontal member 18 by welding or the like. The angled member 42 is preferably substantially longer than the member 34 to provide additional lateral stability to the apparatus when it is being rubbed by cattle or other livestock. Additionally, a small angled member 46 may be welded to the member 34 for attaching a tether that may be used to change the location of the apparatus within the livestock feedlot or the like.

In accordance with an important aspect of the present invention, and referring to FIGS. 1 and 3, a spiral tube or pipe 50 having a lower open end 52 is provided within the elongated cylinder 12 the inside of which defines a reservoir for the oil or insecticide that is used for conditioning the hides of livestock during use. The spiral tube 50 defines an Archimedes' screw pump for transporting the liquid to the upper end therof where it is delivered to the outside of the cylinder where it will gradually flow downwardly for contact with the livestock as they rub against the cylinder 12. As is best shown in FIG. 3, the spiral tube is not terminated perpendicularly relative to the cylinder wall at the top end thereof, but has an end plug 54 or the like therein and an aperture 56 in the side wall of the tube 50 adjacent an aperture 58 located in the side wall of the cylinder 12. As best shown in FIG. 6, the aperture 56 of the tube is not continuously in contact with the side wall of the cylinder, the lower end forming a lip 60 so that liquid will run to the outside of the cylinder. However, the upper end of the aperture 56 is spaced away from the cylinder side wall so that liquid being expelled from the aperture 56 of the tube can run back into the reservoir defined by the cylinder 12 if it does not pass through the aperture 58 to the outside surface thereof.

This configuration insures that liquid will be directed to the outside of the cylinder during periods of little use, but also directs the liquid back into the reservoir when it is being rapidly rotated or otherwise supplying more liquid to the aperture 58 than is needed on the outside of the cylinder. The amount of liquid delivered to the outside can be controlled without restricting the flow of liquid through the spiral tubing, which minimizes the possibility of either an air lock or a blocking accumulation sediment in the coils of the spiral tubing. As the cattle rub against the cylinder 12 and rotate it, as much liquid as possible will be conveyed upwardly through the tubing without restriction, which will tend to minimize the possibility of the tubing becoming blocked. Moreover, the unrestricted flow has the desirable result of mixing the liquid due to the recirculating action. It is possible to clear the spiral tube by high air pressure or the like if the tubing does become blocked for some reason because the apertures 56 and 58 are in line and adjacent one another. In this regard, it is preferred that the aperture 56 be drilled and tapped to permit a positive connection by an air hose to the tubing 50.

For the spiral tube to convey the liquid upwardly it is necessary for the apparatus to have means for limiting the rotation of the cylinder 12 to a single direction which, more specifically, is the clockwise direction as shown in FIGS. 2, 3 and 5. To limit rotation to the clockwise direction, a ratchet mechanism is provided at the upper end support. Referring to FIGS. 4 and 5, the upper end of the cylinder 12 is shown to have a shaft 64 (which may extend through the entire length of the cylinder 12 and extend outwardly of the lower end thereof and be journaled in the bearing 28 associated with the lower frame plate 14, if desired) that is rotatably journaled in a bearing assembly 66 attached to the C-shaped plate 36. On the lower side of the plate 36 are four equilateral triangular shaped plates 68 that are preferably welded in the positions shown in FIG. 5 to define a twelve toothed gear upon which a ratchet member 70 may act to prevent counterclockwise rotation as viewed in FIG. 5. Although the four triangular shaped plates are shown, a greater or lesser number of triangular or other shaped plates may be used, as long as a toothed gear is produced that will provide the desired stopping action. A spacer tube 71 may be provided between the end of the cylinder 12 and the first of the triangular shaped plates 68. An aperture 73 in the spacer tube 71 and another aperture 75 in the end of the cylinder provide a substantially waterproof air vent for the reservoir.

The ratchet member, indicated generally at 70, comprises an upwardly extending portion 72, a generally horizontal portion 74 and a downwardly extending portion 76 as shown in FIG. 5. The ratchet member may conveniently be fabricated from a single piece of metal that is suitably bent to produce the described portions. The portion 76 is preferably welded to the horizontal portion since it should be of somewhat heavier stock. The portion 76 is preferably welded to a short length of pipe 78 which acts as a pivot for the member 70. The pipe 78 pivots around a bolt 86 or the like which may be welded to the plate 36 or may be attached thereto by means of nuts 88 and 90 on the opposite sides of the plate, with the opposite end of the ratchet member 70 being held by the enlarged head 92 of the bolt 68.

Accordingly, as the livestock rub against the surface of the cylinder 12, they will rotate the cylinder in the clockwise direction and the individual teeth of the fabricated gear made from the triangular plates 68 will urge the upward portion 72 to the left and permit the cylinder to rotate in a clockwise direction. Once the individual tooth ratchets by the end of the upward portion 72, the horizontal portion 74 and end portion 76 will provide sufficient weight to cause the portion 72 to move toward the right and re-engage the next adjacent tooth. Counterclockwise rotation is not possible because the teeth will be acting downwardly on the vertical portion 72 which is vertically immovable.

In keeping with the present invention, it is preferred that the outer surface of the cylinder 12 have good frictional or abrasive characteristics so that the livestock can rub against the cylinder with effective results. Accordingly, as best shown in FIGS. 1 and 4, the outer surface of the cylinder is provided with an expanded metal layer 96 that is preferably flattened and spot welded thereto at numerous locations. To fill the cylinder 12 with liquid, an aperture adapted to receive a removable plug or cap 98 is provided in the upper end of the cylinder 12 as shown in FIG. 5.

To control the delivery of the liquid to the outside of the cylinder 12 during operation and referring to FIGS. 1 and 5, a relatively wide clamp band, indicated generally at 100, is provided. The band contacts the outer surface of the cylinder 12 (there being no expanded metal layer in the area covered by the band itself) so that tightening of the band can be effective in severely limiting the flow of liquid to the outside thereof, if desired. More specifically, the band 100 has a pair of perpendicular end portions 102 and 104, each of which have apertures therein for receiving bolts 106 which can be tightened or loosened to adjust the flow of the liquid. In the center of the band 100 there is a raised groove portion 108 which extends circumferentially generally completely around the cylinder 12, although the groove terminates a predetermined distance from the end 102 to define an area 110 that is flat across the complete width thereof. This area is effective to substantially prohibit fluid from being expelled through the aperture 58 if it covers the aperture as shown in FIG. 3. However, when the band is rotated relative to the cylinder 12 so that the circumferential groove 108 is over the aperture as shown in FIG. 4, the liquid can then flow outwardly through the aperture 58 into the groove where it will gradually flow downwardly to the expanded metal 96 as desired.

To adjust the band 100 from the completely "on" or "off" positions, the band may be provided with an elongated slot 112 and a screw 114 or the like which is secured in the wall of the cylinder 12. The screw 114 cooperates with the elongated slot 112 and limits the rotational movement of the band relative to the cylinder between the on position shown in FIG. 4 and the off position shown in FIG. 3. It should be readily apparent that placing the band in an intermediate position may be effective to limit the flow to less than full capacity. Moreover, a small clamping element 116 may be provided between the head of the screw 114 and the band 100 so that as the screw is tightened, it will clamp the band so that it cannot be easily rotated. The apparatus is also preferably provided with a cloth between the cylinder 12 and the clamp band 100 if desired to provide more uniform dispersion of the liquid circumferentially around the cylinder. The cloth may have a number of openings along its length to more readily pass liquid to the outside of the cylinder from the groove 108 in those locations around the circumference of the cylinder.

In addition to the control of the flow of the liquid that is achieved by the angular positioning of the band as has been described, the tightness of the bolts 106 will also have an effect upon the resulting flow of liquid to the lower portion of the cylinder as well. Thus, the amount of liquid that is delivered to the expanded metal portion of the outer surface may be adjusted for different liquid viscosities, amount of use and the like.

Moreover, the amount of liquid that is delivered to the outside of the apparatus is also relatively independent of the speed of rotation of the cylinder in the sense that the spiral tube can deliver substantially more liquid through the aperture 56 of the tube than is passed through the aperture 58 to the outside of the cylinder. Another aperture 120 is preferably provided at the opposite end of the groove 108 to permit the liquid to return to the reservoir. The accumulation of liquid at this end would occur only in the event the groove contained an abundance of liquid, particularly if a cloth band was used. This has the advantage of letting the Archimedes' screw pump run unimpeded and thereby minimize the possibility of the spiral tube 50 becoming blocked. However, the spiral tube or pipe 50 can be relatively easily blown out by using air pressure or the like, in the event that it does become blocked for some reason. This can be done by removing the band 100, inserting an air hose through the aperture 58, connecting the hose to the preferably threaded aperture 56 and turning on the air hose.

Thus, an improved livestock rubbing and liquid applying apparatus has been shown and described which provides dependable service with a minimum of maintainance. Moreover, the apparatus may be economically fabricated from normally available material and components.

Although various embodiments of the invention have been illustrated and described, they will suggest a number of variations and modifications to persons skilled in the art. Accordingly, the scope of the protection afforded this invention should not be limited by the particular embodiments shown and described, but should be determined in terms of the definitions of the invention set forth in the appended claims and equivalents thereof.

Various features of the invention are set forth in the following claims.

What is claimed is:

1. A rubbing and liquid applying apparatus for livestock, comprising, in combination:
    an elongated cylinder having upper and lower end walls, said cylinder defining a reservoir for holding liquid therein;
    frame means for supporting said cylinder at an inclined angle and adapted to permit rotation of said cylinder;
    a spiral tube positioned in said cylinder and adapted to deliver liquid from the lower end thereof through a first aperture at the upper end portion adjacent the upper end portion of said cylinder in response to rotation of said cylinder in a predetermined direction;
    means for limiting rotation of said cylinder to said predetermined direction;
    said cylinder having a second aperture located at the upper end thereof for delivering liquid to the outer surface thereof, the first aperture of said spiral tube being adjacent said second aperture and adapted to communicate liquid from said spiral tube to the outside of said cylinder, said first aperture being in the side of said spiral tube and having its lower side abutting said cylinder side wall to present a smooth path for liquid to run to the outside of the cylinder, the upper side of said aperture being spaced a sufficient distance from the inside of the cylinder to permit liquid to return to said reservoir; and,
    flow control means positioned on the cylinder adjacent said second aperture for regulating the flow of liquid therethrough and for uniformly distributing said liquid around the circumference of said cylinder.

2. Apparatus as defined in claim 1 wherein the upper end portion of said spiral tube has an end plug therein.

3. Apparatus as defined in claim 1 wherein said first aperture is of a size no greater than said second aperture and is internally threaded to permit attachment of an air hose or the like thereto.

4. Apparatus as defined in claim 1 wherein said flow control means comprises a relatively wide band extending circumferentially generally completely around the upper end of said cylinder and having a raised groove extending substantially the length of said band, the groove terminating in a flat portion that is adapted to overlie and cover said second aperture of said cylinder to restrict the flow of liquid therethrough when said band is rotated to a first position, rotation of said band to a second position effectively placing said raised groove adjacent said second aperture to permit liquid through said aperture into said raised groove.

5. Apparatus as defined in claim 1 wherein said rotation limiting means comprises a toothed gear attached to an axial shaft attached to the upper end of said cylinder and a ratchet member pivotally secured to said frame means, said ratchet member having a laterally movable upwardly directed portion, said member including a generally transverse extension that defines a counterweight for returning the upward portion toward said gear subsequent to having been laterally moved away from said gear during rotation of said cylinder in said predetermined direction.

6. Apparatus as defined in claim 1 wherein said frame means comprises an upper end cylinder support, a lower end cylinder support and a generally horizontal member connecting said end supports.

7. Apparatus as defined in claim 6 wherein said lower end cylinder support is a generally flat triangular member, the upper corner of which is bent over to form a protective shield for a bearing of said cylinder.

8. Apparatus as defined in claim 6 wherein the two lower corners of said triangular member are bent to protrude downwardly and engage the ground to resist movement of the frame of the apparatus.

9. A rubbing and liquid applying apparatus for livestock, comprising, in combination:
    an elongated cylinder having upper and lower end walls, said cylinder defining a reservoir for holding liquid therein;
    frame means for supporting said cylinder at an inclined angle and adapted to permit rotation of said cylinder;
    a spiral tube positioned in said cylinder and adapted to deliver liquid from the lower end thereof through a first aperture at the upper end portion adjacent the upper end portion of said cylinder in response to rotation of said cylinder in a predetermined direction;

means for limiting rotation of said cylinder to said predetermined direction;

said cylinder having a second aperture located at the upper end thereof for delivering liquid to the outer surface thereof, the first aperture of said spiral tube being adjacent said second aperture and adapted to communicate liquid from said spiral tube to the outside of said cylinder, the first aperture in the upper end portion of said spiral tube being positioned relative to said second aperture and the inside of said cylinder so that a predetermined amount of liquid is communicated through said first and second apertures to the outside of the cylinder while permitting excess liquid to return to said reservoir; and, flow control means positioned on the cylinder adjacent said second aperture for regulating the flow of liquid therethrough and for uniformly distributing said liquid around the circumference of said cylinder, said flow control means comprising a relatively wide band extending circumferentially generally completely around the upper end of said cylinder and having a raised groove extending substantially the length of said band, the groove terminating in a flat portion as adapted to overlie and cover said second aperture of said cylinder to restrict the flow of liquid therethrough when said band is rotated to a first position, rotation of said band to a second position effectively placing said raised groove adjacent said second aperture to permit liquid through said aperture into said raised groove.

10. Apparatus as defined in claim 9 wherein said band comprises a unitary member having end portions extending generally perpendicularly outwardly from said cylinder and containing apertures in opposed relation, and tightening means for adjusting the tightness of the band relative to the cylinder to thereby adjust the flow of the liquid from the raised groove downwardly on the outside surface of said cylinder.

11. Apparatus as defined in claim 9 wherein said flow control means further includes a cloth strip positioned between said cylinder and said band, said cloth strip having a plurality of perforations spaced along the length thereof for providing more even distribution of liquid around the circumference of the outside of the cylinder.

12. Apparatus as defined in claim 11 wherein said cloth strip perforations are generally circular shaped, the upper portion of which overlie said raised groove, said perforations defining a number of liquid pockets around the circumference of said cylinder.

13. Apparatus as defined in claim 9 including means for releasably securing said band from rotating relative to said cylinder so as to regulate the flow of liquid from said second aperture.

14. Apparatus as defined in claim 13 wherein said means for releasably securing said band includes an elongated slot located between said raised groove and the side of said band and tightening means attached to said cylinder and located within said slot, rotation of said band between said first and second positions causing said tightening means to be moved from one end portion to the opposite end portion of said slot, said tightening means being adapted to releasably hold said band against rotation.

* * * * *